United States Patent
Kasai

(10) Patent No.: US 7,460,570 B2
(45) Date of Patent: Dec. 2, 2008

(54) GREEN COHERENT LIGHT GENERATING DEVICE USING EVEN NONLINEAR CRYSTALS

(75) Inventor: Katsuyuki Kasai, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 254 days.

(21) Appl. No.: 10/952,446

(22) Filed: Sep. 29, 2004

(65) Prior Publication Data

US 2005/0141572 A1 Jun. 30, 2005

(30) Foreign Application Priority Data

Oct. 2, 2003 (JP) ............................. 2003-344407

(51) Int. Cl.
*H01S 3/10* (2006.01)
(52) U.S. Cl. ........................................ 372/22; 359/328
(58) Field of Classification Search ................. 359/333, 359/326, 328, 330, 345; 372/21, 22, 23
See application file for complete search history.

(56) References Cited

U.S. PATENT DOCUMENTS

| | | | | |
|---|---|---|---|---|
| 5,315,433 A | * | 5/1994 | Okazaki et al. | 359/328 |
| 5,732,095 A | * | 3/1998 | Zorabedian | 372/22 |
| 6,137,624 A | * | 10/2000 | Taira | 359/326 |
| 6,172,800 B1 | * | 1/2001 | Kouta | 359/328 |
| 2004/0240492 A1 | * | 12/2004 | Kojima et al. | 372/21 |

* cited by examiner

*Primary Examiner*—Minsun Harvey
*Assistant Examiner*—Tuan N. Nguyen
(74) *Attorney, Agent, or Firm*—Westerman, Hattori, Daniels & Adrian, LLP.

(57) ABSTRACT

An object of the present invention is to provide a comparatively small-scale device, that is a second harmonic generating device of a laser beam with which high-quality and large output light is obtained efficiently and stably. Specifically, the second harmonic generating device of a laser beam source includes a laser beam source, an optical resonator into which the said laser beam is injected, and KTP crystals provided in the said optical resonator. The KTP crystals in the optical resonator are a first a-axis-cut KTP crystal in which a beam of light carries out a-axis propagation and a second a-axis-cut KTP crystal, which is the same length as the first a-axis-cut KTP crystal and is rotated 90 degrees on the a-axis with respect to the first a-axis-cut KTP crystal.

7 Claims, 3 Drawing Sheets

GREEN COHERENT LIGHT GENERATING DEVICE USING EVEN NONLINEAR CRYSTALS

BACKGROUND OF THE INVENTION

1. Field of the Invention

The present invention relates to a green coherent light generating device by means of second harmonic generation (SHG) using a semiconductor laser and KTP crystals, and a method for generating the green coherent light.

2. Description of the Related Art

Green coherent light is used in various fields, for example, optical displays, image related devices, a pump beam of an optical parametric oscillator, and so on. Up to the present, green light is obtained using SHG light of a YAG laser or an Argon laser, and so on. But these lasers need large-scale devices and have the problem that quality of the green light is not good. So a technology to generate coherent green light combining a semiconductor laser and a KTP crystal was developed. (For example, refer to the pages 1192 of the 50th meeting drafts, The Japan Society of Applied Physics and Related Societies (following non-patenting reference 1).)

FIG. 1 shows a schematic diagram of a conventional device (hereinafter referred to as a "conventional device") that generates coherent green light by combining a semiconductor laser and a KTP crystal. As shown in FIG. 1, a conventional device 1 comprises a semiconductor laser 2 which generates 1080 nm wavelength light, an optical resonator 3 into which the light from a semiconductor laser is injected, and one a-cut KTP crystal 4 provided in the optical path in the optical resonator. Two concave mirrors, for example, 3a and 3b compose the optical resonator (optical cavity) 3, and these mirrors may face each other. In addition, although not illustrated especially, another example of the conventional device is a device using a ring-type optical resonator.

A laser beam which has the wavelength of 1080 nm output from the semiconductor laser 2 is introduced into the optical resonator 3 through mirror 3a. It is built up in the optical resonator, the intensity increases, and the light introduced into the optical resonator generates SHG light by the nonlinear effect in the KTP crystal. In order to generate SHG efficiently at the above-mentioned wavelength, the phase matching called TYPE II is taken, and the ordinary and extraordinary rays are used in the KTP crystal that has refractive-index anisotropy. By the refractive-index anisotropy of the KTP crystal, for example, since horizontal polarization and perpendicular polarization have different refractive indices of the KTP crystal, the ordinary and extraordinary rays will experience a different optical path length within a KTP crystal. Moreover, light with a wavelength of 1080 nm which is confined and built up within the optical resonator generates light with a wavelength of 540 nm as SHG light by the nonlinear effect in the KTP crystal. This SHG light is output from the output mirror of the optical resonator.

As shown in FIG. 1, the refractive index of the polarization of the ordinary ray is $n_o$ within a KTP crystal, and the optical path length of the ordinary ray within the KTP crystal is $n_o 1$, provided that the length of the KTP crystal is set to 1. On the other hand, the refractive index of the polarization of the extraordinary ray is $n_e$, and the optical path length of the extraordinary ray within the KTP crystal is $n_e 1$.

In order for light to resonate within the optical resonator and to obtain a powerful output, standing waves must be made within the optical resonator. Namely, a powerful output is obtained by a resonance phenomenon when the optical length is the integral multiple of half-wavelength (however, in a ring-type resonator, it resonates at the time of the integral multiple of wavelength.). If the wavelength of the laser beam from a semiconductor laser is set to λ, and the optical path length in the optical resonator which does not have a KTP crystal is set to L, by making $m_1$ and $m_2$ into an integer, the resonance conditions for the horizontal and perpendicular polarizations are respectively $m_1 \lambda/2 = L + (n_o - 1)1$ and $m_2 \lambda/2 = L + (n_e - 1)1$. Since KTP crystals have refractive-index anisotropy, $n_o$ differs from $n_e$. Therefore, in order to have fulfilled the above-mentioned resonance conditions, L should be adjusted, and also the refractive index of the KTP crystal needed to be controlled by carefully adjusting the crystal temperature.

FIG. 2 is a graph that shows the relation between the resonator (cavity) length and resonance in the case of changing temperature using the conventional device. FIG. 2 shows that in a certain conventional device, the optical resonator length at which the ordinary ray resonates and the optical resonator length at which the extraordinary ray resonates correspond when the temperature of the crystal is 66.6° C. Therefore, at 66.6° C., if the optical resonator of prescribed length is adopted, a resonance phenomenon will happen. However, if the temperature is far from 66.6° C., the resonator length at which the ordinary ray resonates and the resonator length at which the extraordinary ray resonates do not correspond. A permitted range of the temperature is considered to be about 1/100° C. or less. As shown in FIG. 2, resonance conditions do not meet at 64.6° C. and 68.6° C., which are 2° C. away from optimal temperature 66.6° C. Furthermore, at 62.6° C. and 70.6° C., which are 4° C. away from optimal temperature, since the resonator length at which the ordinary ray resonates and the resonator length at which the extraordinary ray resonates are completely different, the resonance cannot be obtained simultaneously. Therefore, in the conventional device, in case of obtaining resonance simultaneously with the ordinary and extraordinary rays, there was a problem that the temperature of the KTP crystal had to be precisely controlled.

FIG. 3 is a graph that shows the relation between the SHG light output of the laser beam only by the nonlinear crystal without an optical resonator, and the SHG light output of the laser beam by the conventional device having an a-cut KTP crystal in an optical resonator. In FIG. 3, a dotted line is the SHG light output of the laser beam only by the nonlinear crystal, and circles are the SHG light output of the laser beam obtained by placing an a-cut KTP crystal in the optical resonator. As explained previously, if the nonlinear crystal is placed in the optical resonator, only at specific temperatures, resonance phenomena will occur simultaneously with the ordinary and extraordinary rays, powerful SHG light will be obtained, and SHG light output will not be obtained except at the specific temperatures.

FIG. 3 shows that, for example, although the maximum output of the SHG (single path) of an a-cut KTP crystal unit is obtained at about 62° C., even if it is going to obtain green coherent light using a conventional device, the resonance does not occur at 62° C., which is the temperature that gives the maximum output of SHG light. On the other hand, FIG. 3 shows that, since the ordinary and extraordinary rays resonate at about 39° C., about 52° C., and about 67° C., SHG light output is obtained from the optical resonator comprising the above-mentioned a-cut KTP crystal. However, these temperatures differ from the temperature at which the maximum efficiency of the nonlinear crystal itself is acquired (the above-mentioned a-cut KTP crystal is about 62° C.). Therefore, in case of obtaining SHG light using the conventional device, there was a problem that the output of SHG light did not become large efficiently. Moreover, there was also a problem that if the temperature of a crystal was not stabilized within about 1/100° C. or less, stable SHG light output was not obtained.

[Non-patenting reference 1] Page 1192 of the 50th meeting drafts, The Japan Society of Applied Physics and Related Societies

SUMMARY OF THE INVENTION

An object of the present invention is to provide a comparatively small scale device, that is the second harmonic generating device, of a laser beam with which high-quality and large output light is obtained efficiently.

Another object of the present invention is to provide a comparatively small-scale device, that is a green coherent light generating device, and with which a high quality and large output is efficiently obtained.

Another object of the present invention is to provide a method to efficiently generate second harmonics that have a high quality and large output.

Another object of the present invention is to provide an efficient method to generate green coherent light that has a high quality and large output.

In order to solve at least one or more of the above-mentioned subjects, the second harmonic generating device of the present invention, that is a second harmonic generating device of a laser beam source, includes a laser beam source, an optical resonator into which the said laser beam is introduced (for example, a Fabry-Perot type resonator, a ring-type resonator, etc.), and nonlinear optical crystals in the said optical resonator, wherein the nonlinear optical crystals, which are two nonlinear optical crystals of the same length, are provided in the optical path of the said optical resonator so that one may be rotated 90 degrees with respect to the other on the optical axis. In addition, in this specification, the phrase of "nonlinear optical crystals are the same length" is used not only when the forms of two nonlinear optics crystals are completely the same but also when the forms are different from each other.

It becomes possible to make the same optical path length for both the horizontal polarization and perpendicular polarization originating in the refractive-index anisotropy of a nonlinear optical crystal, by providing the two nonlinear optical crystals of the same length on the optical path of the said optical resonator so that one may be rotated 90 degrees with respect to the other on the optical axis. Thereby, the simultaneous resonance of both polarizations can be easily obtained without controlling the temperature. That is, according to the second harmonic generating device of the present invention, the resonance condition of the optical resonator and the phase matching condition of nonlinear optical crystals can be optimized easily and simultaneously, and it can be controlled easily to the maximum output conditions of SHG light. Moreover, according to the second harmonic generating device of the present invention, the high quality and large output is efficiently obtained.

In addition, it is permitted to set two or more sets of pairs of two nonlinear optical crystals in the optical resonator using the same principle. Moreover, two or more nonlinear optical crystals may be set in the optical resonator so that the optical path lengths of the horizontal polarization and perpendicular polarization originating in the refractive-index anisotropy of nonlinear optical crystals are the same. In such a case, the same effect can be acquired with having set two nonlinear optical crystals of the same length.

In order to solve at least one or more of the above-mentioned subjects, the second harmonic generating device of the present invention, that is a second harmonic generating device of a laser beam source, includes a laser beam source, an optical resonator into which the said laser beam is injected, and KTP crystals provided in the said optical resonator, wherein the said KTP crystals in the said optical resonator are a first a-axis-cut KTP crystal in which light carries out a-axis propagation and a second a-axis-cut KTP crystal that is the same length as said the first a-axis-cut KTP crystal and is rotated 90 degrees on the a-axis with respect to said the first a-axis-cut KTP crystal. Moreover, the laser beam source is preferably a semiconductor laser.

Since the second harmonic generating device of the present invention includes the first a-axis-cut KTP crystal which has shape of square pole, and the second a-axis-cut KTP crystal which is the same length as said the first a-axis-cut KTP crystal, and is rotated 90 degrees on the a-axis with respect to said the first a-axis-cut KTP crystal, by making the same optical path length for the horizontal polarization and perpendicular polarization originating in the refractive-index anisotropy of a KTP crystal, the resonance of both polarizations can be easily obtained without controlling the temperature. That is, according to the second harmonic generating device of the present invention, the resonance condition of the optical resonator and the phase adjustment condition of the KTP crystals can be optimized easily and simultaneously, and it can be controlled easily to the maximum output conditions of SHG light. Moreover, if a semiconductor laser is used as a laser beam source, with a comparatively small-scale device, green coherent light that has high quality and large output can be efficiently obtained.

The second harmonic generating device of the present invention has preferably a first a-axis-cut KTP crystal and a second a-axis-cut KTP crystal, which are united by fusion or optical contact. Thus, if the first a-axis-cut KTP crystal and the second a-axis-cut KTP crystal are united by fusion or optical contact, it is possible to make an optical resonator of a small scale, and therefore it is possible to can make the device itself of a small scale. Moreover, since it is not necessary to adjust the angle of crystals one by one, it becomes easy to handle.

In order to solve at least one or more of the above-mentioned subjects, the second harmonic generating method of a laser beam of the present invention uses the second harmonic generating device including a laser beam source, an optical resonator into which said laser beam is injected, and nonlinear optical crystals provided in the said optical resonator, wherein the said nonlinear optical crystals consist of at least two nonlinear crystals that are the same length and one of them is rotated 90 degrees with respect to the other on the optical axis. The laser beam is injected into the input mirror which is part of the optical resonator and a second harmonic beam is output from the output mirror which is also part of the optical resonator.

Since such a process is implemented, according to the second harmonic generating method of the laser beam of the present invention, the second harmonic beam that has high quality and large output can be efficiently obtained.

In order to solve at least one or more of the above-mentioned subjects, the second harmonic generating method of the laser beam of the present invention uses the second harmonic generating device including a first a-axis-cut KTP crystal and a second a-axis-cut KTP crystal which is the same length as the first a-axis-cut KTP crystal and is rotated 90 degrees on the a-axis with respect to said the first a-axis-cut KTP crystal in the optical resonator. The laser beam is injected into the input mirror which is part of the optical resonator, and the second harmonic beam is output from the output mirror which is also part of the optical resonator.

Since such a process is implemented, according to the second harmonic generating method of the laser beam of the present invention, green coherent light that has high quality and large output can be efficiently obtained.

Since the present invention includes the above-mentioned construction, by making the same optical path length for the horizontal polarization and perpendicular polarization originating in the refractive-index anisotropy of KTP crystals, the resonance of both polarizations can be easily obtained without controlling the temperature. That is, according to the second harmonic generating device of the present invention, the resonance condition of the optical resonator and the phase matching condition of the KTP crystals can be optimized easily and simultaneously, and it can be controlled easily to the maximum output conditions of SHG light. That is, according to the present invention, it is possible to provide a green coherent light generating device and a method that can obtain the green coherent light that has high quality and large output, efficiently, by using a semiconductor laser and a KTP crystal.

DETAILED DESCRIPTION OF THE PREFERRED EMBODIMENTS

Figure 1:
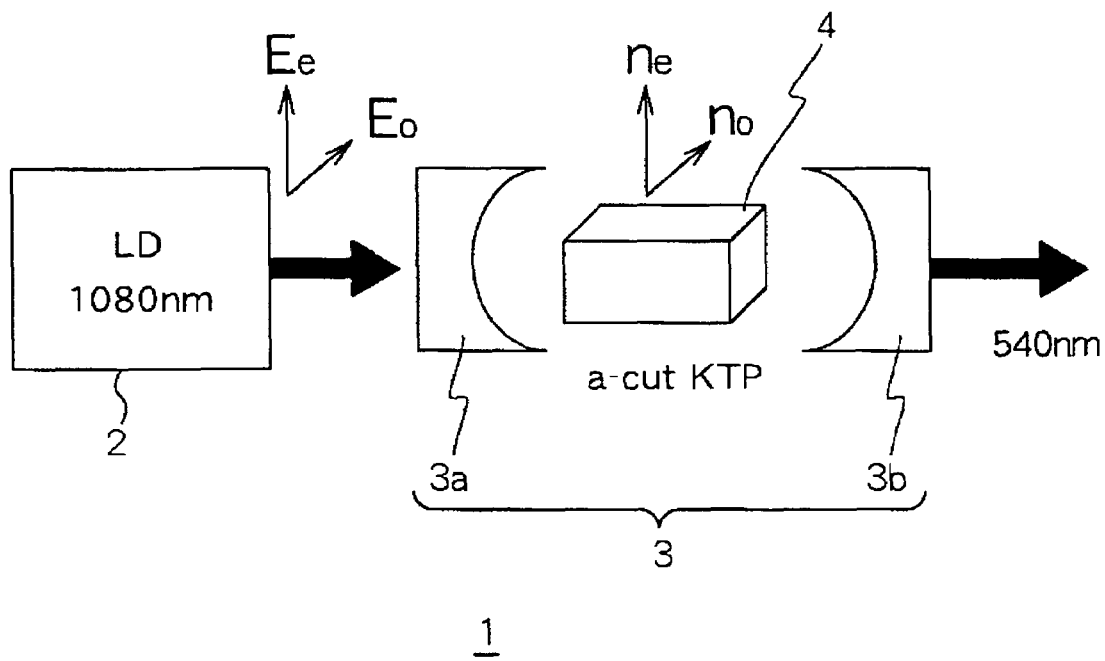
FIG. 1 is a schematic diagram showing a fundamental structure of conventional devices for obtaining green coherent light using a semiconductor laser and a KTP crystal.
Figure 2:
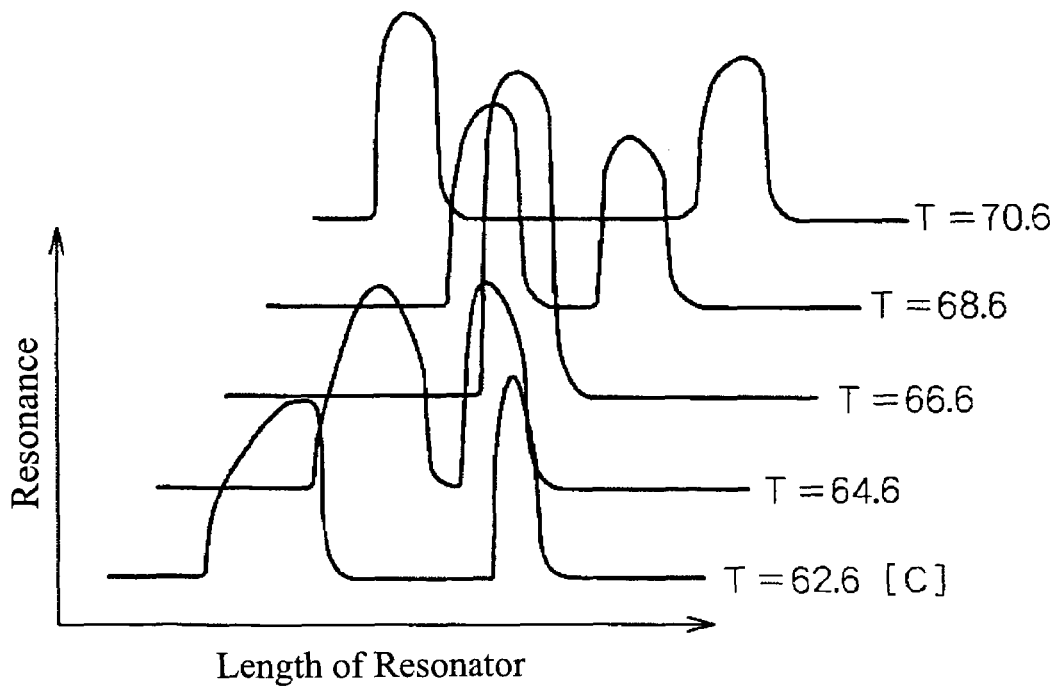
FIG. 2 is the graph showing a relation between the length of a resonator and the cavity resonance curves, for the various crystal temperatures with a conventional device.
Figure 3:
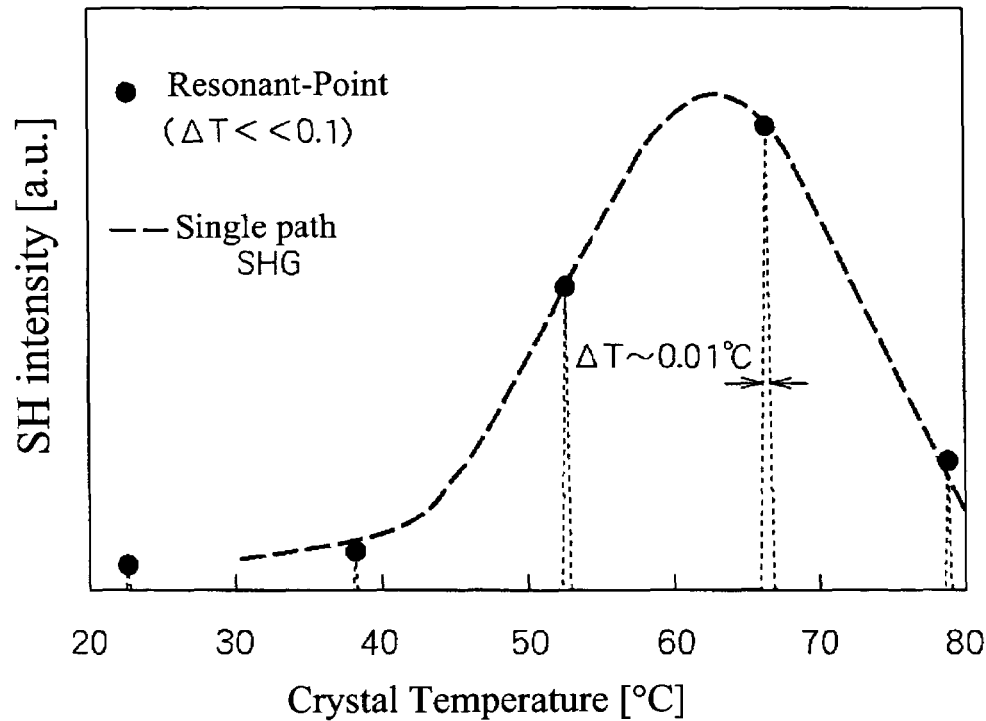
FIG. 3 is the graph which shows the relation between the SHG light output of the laser beam, generated through the nonlinear crystal without an optical resonator, and the SHG light output of the laser beam by the conventional device placing an a-cut KTP crystal in an optical resonator.
Figure 4:
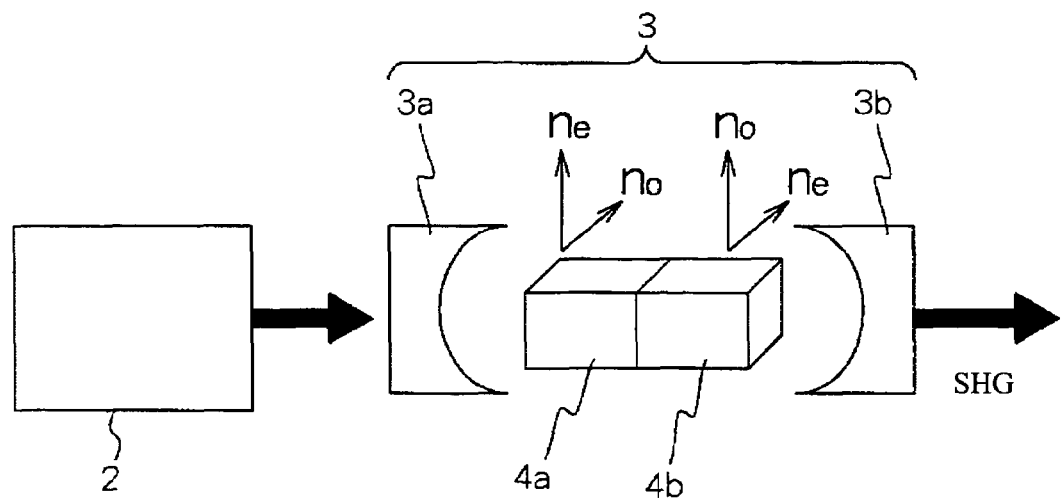
FIG. 4 is the schematic diagram showing a fundamental structure for second harmonic generation of a laser beam source of the present invention.

FIG. 4 is a schematic diagram showing a fundamental structure of a second harmonic generating device of a laser beam source of the present invention. As shown in FIG. 4, the second harmonic generating device of this embodiment, that is a second harmonic generating device of a laser beam, comprises a laser beam source 2, an optical resonator 3 into which the laser beam is introduced, and nonlinear optical crystals (for example, KTP crystals) 4 provided in the said optical resonator, wherein the KTP crystals in the optical resonator are the first a-axis-cut KTP crystal 4a in which a beam of light carries out a-axis propagation and the second a-axis-cut KTP crystal 4b which is the same length as said the first a-axis-cut KTP crystal (for example, the form may be the same as the first a-axis-cut KTP crystal and the one example of the form is usually like a square pole.) and rotated 90 degrees on the a-axis to the first a-axis-cut KTP crystal. In addition, although a Fabry-Perot type second harmonic generating device is shown in FIG. 4, known external resonator type second harmonic generating devices are included in the second harmonic generating device of the present invention.

The examples of a laser beam source 2 are a solid-state laser, a gas laser, a coloring-matter laser, and a semiconductor laser. The preferred example is a semiconductor laser, and an infrared laser beam is used to obtain green SHG light.

Known optical resonators used for SHG can be used for an optical resonator 3, and it is not limited especially. The examples of the optical resonators are the Fabry-Perot type resonator which consists of an input mirror and an output mirror, and a ring type resonator. The example of an input mirror is a mirror which has the transmittivity to couple a laser beam with the resonator and serves as a highly reflective mirror to SHG light. The example of an output mirror is a mirror that serves as a highly reflective mirror to a fundamental wave light, and allows penetration of SHG light. The same interval as known optical resonators is used for an interval of an input mirror and an output mirror, and it depends also on the curvature radius of mirrors, more specifically, the interval ranges from 20 mm to 100 mm. In addition, in the case of a ring type resonator, specifically, the optical path length ranges from 30 cm to 100 cm.

It is the desirable embodiment of the present invention for the interval of an optical resonator to be adjusted for example by changing the position of either an input mirror or an output mirror or both. More specifically, the examples of the desirable embodiment are attaining the desirable position of mirrors by attaching a piezo-electric element to one of mirrors, and feeding back electrically with an external output error signal, and attaining the desirable position of mirrors by using optical feedback.

A nonlinear optical crystal 4 is a crystal which has refractive-index anisotropy. The examples of nonlinear optical crystals are a BBO crystal, an LBO crystal, a KTP crystal, a $KNbO_3$ crystal, etc. For a laser beam which has a wavelength of 1080 nm, a KTP crystal is preferable, and an a-axis-cut KTP crystal is even more preferable. An a-axis-cut KTP crystal means that the KTP crystal is cut so that the propagation direction of the laser beam might correspond to an a-axis of the KTP crystal. When using a laser beam with a wavelength of 994 nm, a b-axis-cut KTP crystal is desirable. In the case of a $KNbO_3$ crystal, the a-axis-cut crystal is phase-matched by temperature tuning around 180° C. with the laser beam near the wavelength of 1060 nm. Similarly in the case of $KNbO_3$ crystal, the b-axis-cut crystal is phase-matched by temperature tuning around −40° C. with the laser beam near the wavelength of 840 nm. In the case of temperature tuning, the wavelength of the laser beam depends on the crystal temperature for phase matching.

The length of a nonlinear crystal ranges practically from 2 mm to 20 mm. A KTP crystal is manufactured by known methods, and it can be manufactured, for example by the method of Japanese Laid-open Patent Hei5-97585.

The one example of the crystal temperature of KTP is 62° C., and it is adjusted so that the maximum output may be given. In order to control the temperature of a KTP crystal, known temperature control systems are used. A system using the Peltier element is, for example, one kind of such temperature control system. In addition, a temperature control system by an oven using a heater is also another example.

Below, the process that obtains SHG light is explained using the second harmonic generating device of the present invention, referring to FIG. 4. Each length of the first a-axis-cut KTP crystal 4a and the second a-axis-cut KTP crystal 4b is set to ½. A semiconductor laser 2 outputs, for example, a laser beam at the wavelength of 1080 nm. This laser beam is introduced into the optical resonator 3 through input mirror 3a, and passes the first a-axis-cut KTP crystal (henceforth it is also called the first crystal) 4a. Within the first crystal, the refractive index for the polarization of the ordinary ray is $n_o$, and the optical path length of the ordinary ray within the first crystal becomes $n_o$ ½. On the other hand, the refractive index for the polarization of the extraordinary ray is $n_e$, and the optical path length of the extraordinary ray within the first crystal is becomes $n_e$ ½.

The laser beam which passed the first crystal 4a passes the second a-axis-cut KTP crystal (henceforth it is also called the second crystal) 4b. Within the second crystal, the refractive index for the polarization which was the ordinary ray within the first crystal is $n_e$, and the optical path length of this polarization within the second crystal is $n_e$ ½. On the other hand, the refractive index within the second crystal of the polarization which was the extraordinary ray within the first crystal is $n_o$, and the optical path length of the polarization within the second crystal becomes $n_o$ ½. The optical path lengths of both polarizations which passed the first and second crystals become $(n_e 1 + n_o 1)/2$ equally.

Figure 5:
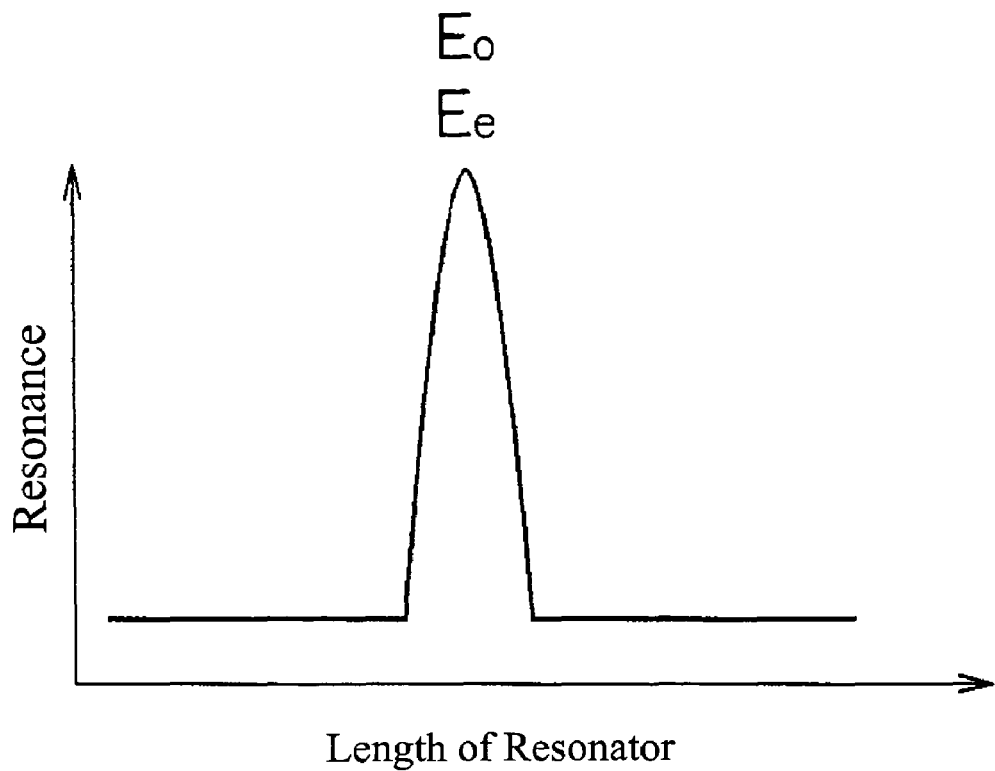
FIG. 5 is the graph showing the resonance condition of ordinary and extraordinary rays.

FIG. 5 shows the resonance curve of the ordinary and extraordinary rays, as a function of the optical resonator length. FIG. 5 shows that, in the second harmonic generating device of the present invention, since the optical path length of the two orthogonal polarizations used in TYPE-II phase matching is equal regardless of the refractive-index anisotropy of the nonlinear optical crystal, in arbitrary temperature conditions, the simultaneous resonance of the ordinary and extraordinary rays is obtained by adjusting the length of the resonator.

Figure 6:
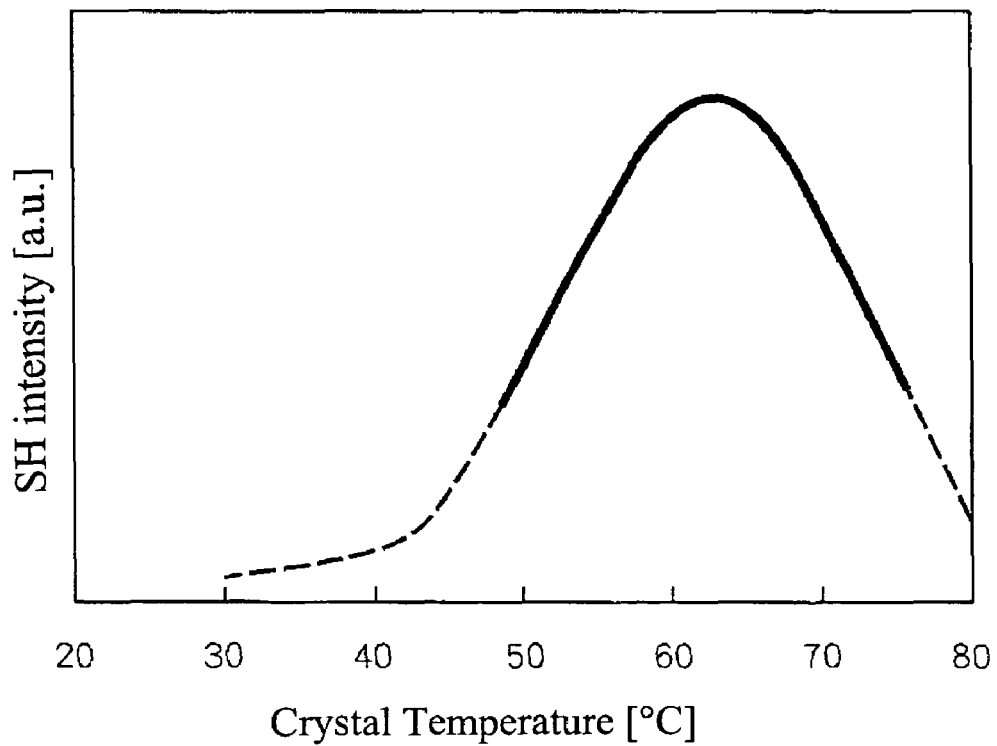
FIG. 6 is the graph showing the output characteristic of second harmonic generation using the present invention.

FIG. 6 is the graph showing the output characteristic of the second harmonic generating device of the present invention. As explained previously, in the second harmonic generating device of the present invention, if the length of the resonator is controlled, the simultaneous resonance of the ordinary and extraordinary rays is obtained in arbitrary temperature. Therefore, with the second harmonic generating device of the present invention, since SHG light is generated at the crystal temperature (in the graph it is about 62° C.) which gives the maximum SHG output of a semiconductor laser, compared with the former, SHG light, which has a stable and high output, is obtained efficiently.

INDUSTRIAL APPLICABILITY

According to the present invention, green coherent light which has high quality and high output is obtained efficiently. This coherent light is used as the pump light of optical parametric oscillators. According to the present invention, since green light is obtained with a simple and small-scale device, it may be used for next-generation displays, image related devices, etc. According to the present invention, since a semiconductor laser is used for a light source, compared with the SHG light of the YAG laser and the argon laser which have been conventionally used as green coherent light, the price of the device and the running cost is reduced.

What is claimed is:

1. A second harmonic generating device of a laser beam source, comprising:
   a laser beam source which is a semiconductor laser;
   an optical resonator into which the laser beam is injected;
   a feedback means for adjusting a length of the optical resonator so that simultaneous resonance of ordinary and extraordinary rays is obtained;
   nonlinear optical crystals provided in the optical resonator; and
   a temperature control system for controlling the temperature of said nonlinear optical crystals,
   wherein two of said nonlinear optical crystals are nonlinear optical crystals of the same length and are provided in the optical path of the optical resonator, such that the one of said two nonlinear optical crystals is rotated 90 degrees with respect to the other one of said two nonlinear optical crystals on the optical axis, thereby the simultaneous resonance is being obtained around 62 degrees Celsius.

2. A second harmonic generating device of a laser beam source, comprising:
   a laser beam source;
   an optical resonator into which the laser beam is injected;
   KTP crystals provided in the optical resonator, a feedback means for adjusting a length of the optical resonator being adjusted so that simultaneous resonance of ordinary and extraordinary rays is obtained; and
   a temperature control system for controlling the temperature of said nonlinear optical crystals,
   wherein the KTP crystals in the optical resonator are a first a-axis-cut KTP crystal in which light carries out a-axis propagation and a second a-axis-cut KTP crystal that is the same length as said first a-axis-cut KTP crystal and is rotated 90 degrees with respect to the first a-axis-cut KTP crystal on the a-axis, thereby the simultaneous resonance being obtained around 62 degrees Celsius.

3. The second harmonic generating device of a laser beam source in accordance with claim 2, wherein said laser beam source is a semiconductor laser.

4. The second harmonic generating device of a laser beam source in accordance with claim 2, wherein the first a-axis-cut KTP crystal and the second a-axis-cut KTP crystal are united by one of fusion and optical contact.

5. A method for generating second harmonic light of a laser beam, using a second harmonic generating device that includes a laser beam source which is a semiconductor laser, an optical resonator into which the said laser beam is injected, and nonlinear optical crystals provided in the optical resonator, comprising the steps of:
   adjusting the length of the optical resonator so that simultaneous resonance of ordinary and extraordinary rays is obtained;
   projecting a laser beam onto an input mirror of the optical resonator; controlling the temperature of said nonlinear optical crystals with a temperature control system; and
   outputting second harmonic light of the laser beam from an output mirror of the optical resonator,
   wherein at least two nonlinear crystals of the same length are used as said nonlinear optical crystals and one of which is rotated 90 degrees with respect to the other on an optical axis, thereby the simultaneous resonance is being obtained around 62 degrees Celsius.

6. A method for generating second harmonic light of a laser beam, using a second harmonic generating device that includes a first a-axis-cut KTP crystal and a second a-axis-cut KTP crystal that is the same length as the first a-axis-cut KTP crystal and rotated 90 degrees on a-axis to the first a-axis-cut KTP crystal in an optical resonator, comprising the steps of:
   adjusting the length of the optical resonator so that simultaneous resonance of ordinary and extraordinary rays is obtained;
   projecting a laser beam onto an input mirror of the optical resonator; controlling the temperature of said nonlinear optical crystals with a temperature control system; and
   outputting second harmonic light of the laser beam from an output mirror of the optical resonator, thereby the simultaneous resonance is being obtained around 62 degrees Celsius.

7. The method for generating second harmonic light of a laser beam in accordance with claim 6, wherein the step of controlling the temperature of said nonlinear optical crystals with a temperature control system controls the temperature to be 62 degrees Celsius.

* * * * *